May 25, 1954
G. R. McDONALD
2,679,625
EXCITATION SYSTEM
Filed Feb. 28, 1952
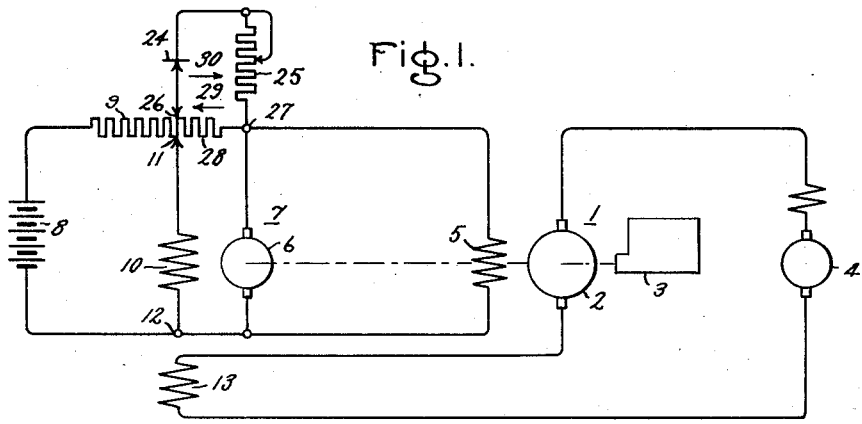
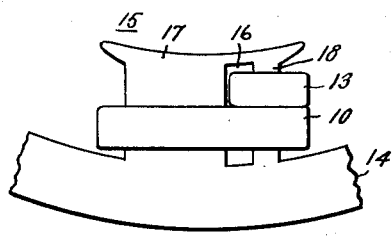
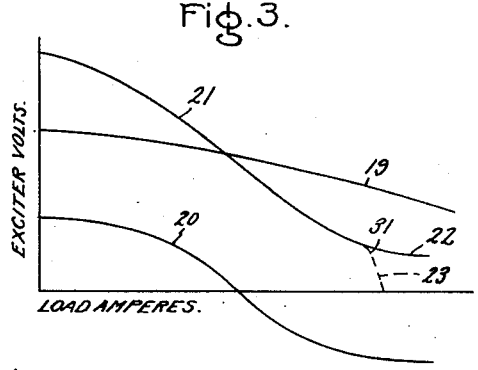
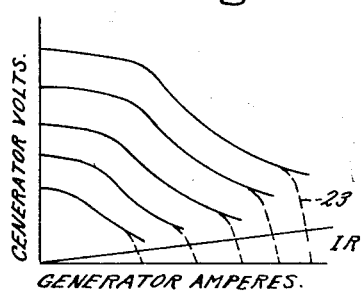
Inventor:
Gordon R. Mc. Donald,
by Ernest H. C. Britton
His Attorney.

Patented May 25, 1954

2,679,625

UNITED STATES PATENT OFFICE 2,679,625

EXCITATION SYSTEM

Gordon R. McDonald, Erie, Pa., assignor to General Electric Company, a corporation of New York Application February 28, 1952, Serial No. 273,951

15 Claims. (Cl. 322—76)

This invention relates to excitation systems for direct current generators and more particularly to an excitation system for a prime mover-driven traction generator for use in a self-propelled vehicle, such as a diesel-electric locomotive.

In the design of the excitation and power circuits for self-propelled vehicles, such as diesel-electric locomotives, it is considered good engineering practice to design the system so that the characteristic curve of the traction generator corresponds to the output curve of the prime mover. This may be accomplished by providing a split-pole exciter for the traction generator having a shunt field winding and a differential series field winding energized by the generator load current. With such a system, however, it is desirable to provide control of tractive effort during starting and it is further desirable to provide an arrangement to prevent the generator from supplying current which will exceed the maximum limits of the traction motors and/or the generator, i. e., a generator current limit.

It is, therefore, an object of this invention to provide an improved excitation system for a prime mover-driven direct current traction generator, wherein tractive effort control and current limitation are provided.

Further objects and advantages of this invention will become apparent by reference to the following description and the accompanying drawing, and the features of novelty which characterize this invention will be pointed out with particularity in the claims annexed to and forming a part of this specification.

In accordance with this invention, an exciter machine is provided having its armature connected to energize the field winding of a direct current generator. A source of direct current, such as a battery, and a resistor are connected in series across the armature of the exciter and the shunt field winding of the exciter is connected across a tap on the resistor and the side of the exciter armature connected to the battery. The exciter is also provided with a differential field winding adapted to be connected in series with the generator armature and the shunt and differential field windings of the exciter may be positioned on a split pole stator. With the connection described above, the exciter shunt field will be separately excited from the battery and self- excited from the exciter armature in a ratio depending upon the position of the resistor tap and the output voltage of the exciter. In order to provide the current limiting feature, a spill circuit is provided comprising a serially connected rectifier and resistor connected across another tap on the first resistor and the side of the exciter armature connected to the first resistor. With this arrangement, when the exciter output voltage falls below the voltage drop across the exciter shunt field, current will flow from the battery to the exciter armature and with the rectifier arranged to pass current from the battery to the exciter armature only, current is diverted from the exciter shunt field winding decreasing the exciter output voltage and thus in turn further decreasing the exciter and generator outputs.

In the drawing, Fig. 1 is a schematic diagram illustrating the improved current limiting excitation system of this invention; Fig. 2 is a fragmentary view showing the split pole arrangement of the exciter of Fig. 1; Fig. 3 shows the action of the differential series exciter field winding to produce a characteristic curve corresponding to the prime mover; and Fig. 4 shows a family of generator characteristics obtained with the split pole excitation and current limit of this invention with different engine speeds.

Referring now to Fig. 1, there is shown a direct current generator 1, such as a traction generator for a self-propelled vehicle, for example, a diesel-electric locomotive, having an armature 2 driven by a suitable prime mover 3. The armature 2 of the traction generator 1 is connected in a loop circuit with the traction motors of the vehicle, one of which is shown at 4. The traction generator 1 is provided with a separately excited field winding 5 connected for energization across the armature 6 of split pole exciter 7. A battery 8 and a resistor 9 are connected in series across the armature 6 of the exciter 7 and the shunt field 10 of the exciter is connected across a tap 11 on the resistor 9 and the side of the exciter armature 6 connected to the battery 8, as at 12. The exciter 7 is also provided with a differential series field winding 13 arranged in series with the armature 2 of the generator 1. Referring now to Fig. 2, there is shown a portion of the stator frame 14 of the exciter 7 with field pole 15 projecting therefrom. In the split pole arrangement, a slot 16 is formed in the pole piece defining a large section of the pole 17 and a small section 18. The shunt field winding 10 embraces the entire pole while the differential winding 13, which is wound to oppose the shunt winding 10, embraces only the small section 18 of the pole 15.

The desired generator characteristic may be approximated by the differential field excitation arrangement thus far described above. Referring to Fig. 3, the curve 19 represents the conventional shunt characteristic of a generator, i. e., the characteristic of the exciter 7 due to the action of the shunt field winding 10 alone. The curve 20 on the other hand represents the excitation due to the series differential winding 13. It will be readily seen that since the exciter shunt winding 10 and differential series winding 13 are wound on the same poles as shown in Fig. 2, the resultant output characteristic of the machine will be as represented by the curve 21. It will be understood that the prime mover is capable of operating the generator in the region 22 of the curve 21 and thus excessively high load current may result with accompanying excessive motor torque and resultant wheel slipping, unless some means for limiting the current, for example along the dashed line 23, is provided.

In order to provide this current limit, a rectifier 24 and a resistor 25 are connected in series across a second tap 26 on the resistor 9 and the side of the exciter armature 6 connected to the resistor 9, as at 27. As will be seen in Fig. 1, the rectifier 24 is oriented to pass current from the battery 8 to the exciter armature 6 and will, therefore, of course, block current from flowing in the reverse direction, i. e., from exciter armature 6 toward the battery 8. It will be readily seen that the output voltage of the exciter 7 and, therefore, the output voltage of the generator 1, depends upon the combination of excitation provided for the exciter by the action of its shunt field 10 and differential field 13 and it will also be seen that at high voltages of the exciter, the voltage across the shunt field 10 may be less than the exciter armature voltage and, conversely, at heavy generator loads, due to the action of the differential field 13, the exciter armature voltage may be less than the voltage across the shunt field 10. Hence, as will be hereinafter described, the spill circuit including rectifier 24 and resistor 25 is effective when the exciter armature voltage is less than the voltage across the shunt field 10 to provide the current limiting feature.

As pointed out above, when the exciter armature voltage is greater than the voltage drop across the shunt field 10, the exciter shunt field 10 will be partially separately excited by battery 8 and partially self-excited from the exciter armature 6 with the ratio of current supplied by each depending upon the position of the tap 11 and the value of the output voltage across the armature 6. Assuming a normal load on the generator 1, with the voltage across the shunt field 10 less than the voltage across the exciter armature 6, current will be flowing through the portion 28 of the resistor 9 in the direction shown by the arrow 29 with the voltage drops across the resistor portion 28 and the shunt field 10 adding to equal the output voltage across the exciter armature 6. Under this condition, with the voltage drop across resistor portion 28 in the direction shown, no current will flow through the spill circuit by virtue of the orientation of the rectifier 24. Assuming now that the generator load increases, the action of the differential field 13 will decrease the exciter output voltage, as shown in Fig. 3 and at some point, the voltage across exciter armature 6 will drop to a value equal to the voltage drop across the shunt field 10. At this point, therefore, there will be no voltage drop across the resistor portion 28 and, therefore, no current flowing in that portion; with the armature 6 of the exciter 7 furnishing current exclusively to the field 5 of generator 1 and the battery 8 furnishing current exclusively to the shunt field 10. As the load current of the generator 1 increases, however, due to the action of the differential field 13 further reducing the output voltage of the exciter 7, the voltage across the exciter armature 6 will fall below the voltage drop across the shunt field 10, thus producing a voltage drop in the direction shown by the arrow 30 across the resistor portion 28, the voltage drop 30 and the output voltage across the exciter armature 7 in this case adding to equal the voltage drop across the shunt field 10. Current from the battery 8 will, therefore, in addition to flowing through the shunt field 10, also flow through the resistor portion 28 and the generator field winding 5. It can be readily seen that as soon as the voltage drop across the resistor portion 28 reverses from the direction 29 to the direction 30, the rectifier 24 will become effective and current will also flow from the battery 8 through the spill circuit to the exciter armature 6 in addition to flowing through the resistor portion 28. The spill circuit, therefore, when functioning, has the effect of reducing the resistance between the tap 11 and the connection 27, thus diverting current from the shunt field 10 to further decrease the exciter output voltage. This effect is, of course, cumulative and the resultant current limiting produces the characteristic shown by the dashed line 23 in Fig. 3.

It will be readily apparent that with proper selection of the circuit components, the spill circuit including the rectifier 24 and resistor 25 may be tapped into the resistor 9 at the point where it is desired to start limiting the exciter output, i. e., by moving the tap 26. As pointed out above, as the generator load tends to increase, the differential field 13 will still further reduce the exciter output voltage with respect to the shunt field 10 and the flow of current from the battery through the rectifier 24 and resistor 25 in addition to the flow through the resistor portion 28 will further decrease the excitation of the exciter shunt field 10. The rate of this decrease, or the slope of the dotted line 23 may be adjusted by the value of the resistance 25.

It will be further readily apparent that the rectifier 24 may be either of the dry variety, i. e., a copper oxide type rectifier, or may be a tube-type rectifier. In any event, the rectifier 24 will normally have a high resistance at low currents which decreases as the current flow therethrough is increased. At very low currents, or close to the spill point, the resistance of the rectifier forms an appreciable part of the spill circuit, consequently producing the rounded upper portion of the current limit characteristic, as shown at 31 in Fig. 3.

Referring to Fig. 4, there is shown a family of generator characteristic curves, each curve representing an engine output responsive to a particular throttle position or notch. It will be readily apparent that the same current limiting effect is produced for each notch position. Inspection of Fig. 4 will further indicate that this current limiting system provides more throttle notches available for starting. It will be noted that at the higher notch positions, the solid characteristic lines, i. e. without the current limit feature, would tend to intersect the motor IR line at very high values of current which could not be supplied by the system. The application of the improved limit arrangement of this invention brings these characteristic lines down so that they intersect the IR line at more reasonable current values within the capability of the generator, therefore, making more notches available before reaching the slipping point of the wheels or within the maximum desirable generator current limit. Two types of controllers may be used with this split-pole excitation system, i. e., a notchless controller or a controller having a definite number of notches or positions. Where a notchless controller is used, the tractive effort may be varied by very small increments as desired by the engineer. Where a controller having a definite number of notches is employed, there will normally be 7 or 8 controller positions. The current limit feature of this invention is particularly advantageous when applied with this type of controller since instead of reaching the slipping point of the wheels in 3 or 4 notches, the tractive effort increments are reduced and can be spread out to utilize all of the available notches of the controller.

It will now be readily apparent that this invention provides an improved excitation system for generators, particularly traction generators, which prevents the generator from supplying current which, under good rail conditions, might otherwise exceed the desirable maximum limit. The circuit also provides an adjustment of the maximum current or tractive effort for full engine speed and horsepower, with corresponding current limits at low values being obtained for operation at reduced engine speed and horsepower. As pointed out above, this system makes more throttle notches available for starting and in addition provides only one adjustment for the starting point of the current limit, i. e., adjustment of the tap 26 on the resistor 9. In addition, only one adjustment is necessary to control the slope or rate of current limit i. e., adjustment of the variable resistor 25. With this improved excitation system, no stability problems are involved even though a wide range of slopes or rates may be chosen for the current limits and it will also be readily apparent that this system may be applied to existing equipments with a minimum of connections and that the components necessary to obtain this type of operation are both simple and inexpensive. While a battery 8 has been referred to, it will be readily apparent that any other source of direct current may be utilized and further, while this circuit is particularly effective when applied to the split-pole type of exciter, the arrangement is equally applicable to any type of exciter or generator using a combination of shunt field and differential series field excitation.

While I have shown and described a particular embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

What I claim as new and desire to secure by Letters Patent of the United States is:

1. An excitation system for a direct current generator having a separately excited field winding comprising an exciter machine for energizing said generator field winding, a source of direct current and a resistor connected in circuit with the armature of said exciter, a shunt field winding for said exciter connected across said exciter armature and a portion of said resistor whereby said exciter shunt field winding is separately excited by said source of direct current and self-excited by said exciter armature in a ratio depending on said resistor portion and the output voltage of said exciter, a differential field winding for said exciter connected to be energized in response to the load current of said generator, and a spill circuit connected across at least said portion of said resistor and including valve means arranged to pass current from said source of direct current to said exciter armature whereby the output voltage of said exciter and the load current of said generator are limited when said exciter output voltage falls below the voltage across said exciter shunt field.

2. An excitation system for a direct current generator having a separately excited field winding comprising an exciter machine for energizing said generator field winding, a serially connected source of direct current and a resistor connected in circuit with the armature of said exciter, a shunt field winding for said exciter connected across a first portion of said resistor and said source of direct current whereby said exciter shunt field winding is separately excited by said source of direct current and self-excited by said exciter armature in a ratio depending on said resistor portion and the output voltage of said exciter, a differential field winding for said exciter connected to be energized in response to the load current of said generator, and a spill circuit connected across another portion of said resistor and including valve means arranged to pass current from said source of direct current to said exciter whereby the output of said exciter and the load current of said generator are limited when said exciter output voltage falls below the voltage drop across said exciter shunt field.

3. An excitation system for a direct current generator having a separately excited field winding comprising an exciter machine for energizing said generator field winding, a source of direct current and a resistor connected in series across the armature of said exciter, a shunt field winding for said exciter connected across a first portion of said resistor and said exciter armature whereby said exciter shunt field winding is separately excited by said source of direct current and self-excited by said exciter armature in a ratio depending on said resistor portion and the output voltage of said exciter, a differential field winding for said exciter connected to be energized responsive to the load current of said generator, and a spill circuit connected across another portion of said resistor and including valve means arranged to pass current from said source of direct current to said exciter whereby the output of said exciter and the load current of said generator are limited when said exciter output voltage falls below the voltage drop across said exciter shunt field.

4. An excitation system for a direct current generator having a separately excited field winding comprising an exciter machine for energizing said generator field winding, a source of direct current and a resistor connected in series across the armature of said exciter, a shunt field winding for said exciter connected across a first portion of said resistor and said exciter armature whereby said exciter shunt field winding is separately excited by said source of direct current and self-excited by said exciter armature in a ratio depending on said resistor portion and the output voltage of said exciter, a differential field winding for said exciter connected to be energized responsive to the load current of said generator, and a spill circuit connected across another portion of said resistor, and including a rectifier arranged to pass current from said source of direct current to said exciter whereby the output of said exciter and the load current of said generator are limited when said exciter output voltage falls below the voltage drop across said exciter shunt field.

5. An excitation system for a direct current generator having a separately excited field winding comprising an exciter machine for energizing said generator field winding, a source of direct current and a resistor connected in series across the armature of said exciter, a shunt field winding for said exciter connected across a first portion of said resistor and said exciter armature whereby said exciter shunt field winding is separately excited by said source of direct current and self-excited by said exciter armature in a ratio depending on said resistor portion and the output voltage of said exciter, a differential field winding for said exciter connected to be energized responsive to the load current of said generator, and a spill circuit connected across another portion of said resistor and including a rectifier and a resistor connected in series, said rectifier being arranged to pass current from said source of direct current to said exciter whereby the output of said exciter and the load current of said generator are limited when said exciter output voltage falls below the voltage drop across said exciter shunt field.

6. An excitation system for a direct current generator having a separately excited field winding comprising an exciter machine for energizing said generator field winding, a source of direct current and a first resistor serially connected across the armature of said exciter, a shunt field winding for said exciter connected across a first tap on said resistor and the side of said exciter armature connected to said source of direct current whereby said exciter shunt field winding is separately excited by said source of direct current and self-excited from said exciter armature in a ratio depending on the position of said tap and the output voltage of said exciter, a differential field winding for said exciter connected to be energized responsive to the load current of said generator, and a spill circuit connected across another tap on said resistor and the side of said exciter armature connected to said resistor and including a rectifier and another resistor connected in series, said rectifier being arranged to pass current from said source of direct current to said exciter armature whereby the output voltage of said exciter and the load current of said generator are limited when said exciter output voltage falls below the voltage drop across said exciter shunt field.

7. An excitation system for a direct current generator having a separately excited field winding comprising an exciter machine for energizing said generator field winding, a battery and a resistor connected in circuit with the armature of said exciter, a shunt field winding for said exciter connected across said exciter armature and a portion of said resistor whereby said exciter shunt field winding is separately excited by said battery and self-excited by said exciter armature in a ratio depending on said resistor portion and the output voltage of said exciter, a differential field winding for said exciter connected to be energized responsive to the load current of said generator, and a spill circuit connected across at least said portion of said resistor and including a rectifier arranged to pass current from said battery to said exciter armature whereby the output voltage of said exciter and the load current of said generator are limited when said exciter output voltage falls below the voltage drop across said exciter shunt field.

8. An excitation system for a direct current generator having a separately excited field winding comprising an exciter machine for energizing said generator field winding, a serially connected battery and resistor connected in circuit with the armature of said exciter, a shunt field winding for said exciter connected across a first portion of said resistor and said battery whereby said exciter shunt field winding is separately excited by said battery and self-excited by said exciter armature in a ratio depending on said resistor portion and the output voltage of said exciter, a differential field winding for said exciter connected to be energized responsive to the load current of said generator, and a spill circuit connected across another portion of said resistor and including a rectifier arranged to pass current from said battery to said exciter whereby the output of said exciter and the load current of said generator are limited when said exciter output voltage falls below the voltage drop across said exciter shunt field.

9. An excitation system for a direct current generator having a separately excited field winding comprising an exciter machine for energizing said generator field winding, a battery and a resistor connected in series across the armature of said exciter, a shunt field winding for said exciter connected across a first portion of said resistor and said exciter armature whereby said exciter shunt field winding is separately excited by said battery and self-excited by said exciter armature in a ratio depending on said resistor portion and the output voltage of said exciter, a differential field winding for said exciter connected to be energized responsive to the load current of said generator, and a spill circuit connected across another portion of said resistor and including a rectifier arranged to pass current from said battery to said exciter whereby the output of said exciter and the load current of said generator are limited when said exciter output voltage falls below the voltage drop across said exciter shunt field.

10. An excitation system for a direct current generator having a separately excited field winding comprising an exciter machine for energizing said generator field winding, a battery and a resistor connected in series across the armature of said exciter, a shunt field winding for said exciter connected across a first portion of said resistor and said exciter armature whereby said exciter shunt field winding is separately excited by said battery and self-excited by said exciter armature in a ratio depending on said resistor portion and the output voltage of said exciter, a differential field winding for said exciter connected to be energized responsive to the load current of said generator, and a spill circuit connected across another portion of said resistor and including a rectifier and another resistor connected in series, said rectifier being arranged to pass current from said battery to said exciter whereby the output of said exciter and the load current of said generator are limited when said exciter output voltage falls below the voltage drop across said exciter shunt field.

11. An excitation system for a direct current generator having a separately excited field winding comprising an exciter machine having its armature connected across said generator field winding for energizing the same, a battery and a first resistor serially connected across said exciter armature, a shunt field winding for said exciter machine connected across a tap on said resistor and the side of said exciter armature connected to said battery whereby said exciter shunt field winding is separately excited by said battery and self-excited from said exciter armature in a ratio depending on the position of said tap and the output voltage of said exciter, a differential field winding for said exciter connected in series with the armature of said generator, and a spill circuit connected across another tap on said resistor and the side of said exciter connected to said resistor comprising a rectifier and a resistor connected in series, said rectifier being oriented to pass current from said battery to said exciter armature whereby the output voltage of said exciter and the load current of said generator are limited when said exciter output voltage falls below the voltage drop across said exciter shunt field.

12. An excitation system for a direct current generator having a separately excited field winding comprising a split pole exciter machine having its armature connected across said generator field winding for energizing the same, a battery and a first resistor serially connected across said exciter armature, a shunt field winding for said exciter machine connected across a first tap on said resistor and the side of said exciter armature connected to said battery whereby said exciter shunt field winding is separately excited by said battery and self-excited from said exciter armature in a ratio depending on the position of said tap and the output voltage of said exciter, a differential field winding for said exciter connected in series with the armature of said generator, and a spill circuit connected across another tap on said resistor and the side of said exciter connected to said resistor comprising a rectifier and another resistor connected in series, said rectifier being arranged to pass current from said battery to said exciter armature whereby the output voltage of said exciter and the load current of said generator are limited when said exciter output voltage falls below the voltage drop across said exciter shunt field.

13. A current limiting system for a generator comprising a shunt field winding for said generator, a source of direct current and a resistor connected in circuit with the armature of said generator, said shunt field winding being connected across said armature and a portion of said resistor whereby said shunt field winding is separately excited by said source of direct current and self-excited by said armature in a ratio depending on said resistor portion and the output voltage of said armature, a differential field winding for said generator, and a spill circuit connected across at least said portion of said resistor and including valve means arranged to pass current from said source of direct current to said armature whereby the load current of said generator is limited when the output voltage across said armature falls below the voltage drop across said shunt field.

14. A current limiting system for a generator comprising a serially connected source of direct current and a resistor comprising a source of direct current and a resistor connected in series across the armature of said generator, a shunt field winding for said generator connected across a first portion of said resistor and the armature of said generator whereby said shunt field winding is separately excited by said source of direct current and self-excited by said armature in a ratio depending on said resistor portion and the output voltage of said armature, a differential field winding for said generator, and a spill circuit connected across another portion of said resistor and including a rectifier arranged to pass current from said source of direct current to said armature whereby the load current of said generator is limited when the output voltage of said armature falls below the voltage drop across said shunt field.

15. A current limiting system for a generator comprising a battery and a first resistor serially connected across the armature of said generator, a shunt field winding for said generator connected across a first tap on said resistor and the side of said armature connected to said battery whereby said shunt field winding is separately excited by said battery and self-excited from said armature in a ratio depending on the position of said tap and the output voltage of said armature, a control differential field winding for said generator, and a spill circuit connected across another tap on said resistor and the side of said armature connected to said resistor comprising a rectifier and another resistor connected in series, said rectifier being arranged to pass current from said battery to said armature whereby the load current of said generator is limited when the output voltage of said armature falls below the voltage drop across said shunt field.

References Cited in the file of this patent

UNITED STATES PATENTS

| Number | Name | Date |
| --- | --- | --- |
| 1,527,641 | Gilt | Feb. 24, 1925 |
| 2,066,919 | West | Jan. 5, 1937 |
| 2,072,781 | Watkins et al. | Mar. 2, 1937 |
| 2,076,962 | O'Hagan | Apr. 13, 1937 |
| 2,285,982 | Keep | June 9, 1942 |
| 2,290,667 | Aydelott | July 21, 1942 |
| 2,311,285 | Stamm | Feb. 16, 1943 |
| 2,324,293 | Edwards | July 13, 1943 |
| 2,443,300 | Carter | June 15, 1948 |
| 2,454,165 | Harder | Nov. 16, 1948 |
| 2,454,211 | Rustebakke | Nov. 16, 1948 |
| 2,501,477 | Pestarini | Mar. 21, 1950 |
| 2,510,669 | Thomas | June 6, 1950 |

FOREIGN PATENTS

| Number | Country | Date |
| --- | --- | --- |
| 391,767 | Great Britain | July 31, 1931 |